United States Patent [19]

Keller

[11] Patent Number: 4,465,091

[45] Date of Patent: Aug. 14, 1984

[54] IMPROVED SELF-GRINDING VALVE

[75] Inventor: Leander L. Keller, Laplace, La.

[73] Assignee: Kaiser Aluminum & Chemical Corporation, Oakland, Calif.

[21] Appl. No.: 420,440

[22] Filed: Sep. 20, 1982

[51] Int. Cl.³ .................... F16K 29/02; F16K 31/53

[52] U.S. Cl. .................... 137/243.6; 51/241 VS; 74/25; 74/89.15; 74/424.8 VA; 137/331; 251/229; 251/249.5; 251/267

[58] Field of Search .................. 137/243, 243.6, 243.7, 137/330, 331; 74/89.15, 424.8 R, 424.8 VA, 25; 251/133, 134, 229, 248, 249.5, 218, 264, 267

[56] References Cited

U.S. PATENT DOCUMENTS

| | | | |
|---|---|---|---|
| 2,238,814 | 4/1941 | Kneass, Jr. | 137/243.6 |
| 2,996,075 | 8/1961 | Deimer et al. | 137/243 |
| 3,220,431 | 11/1965 | Morrell | 137/243.6 |
| 3,505,888 | 4/1970 | Denkowski | 74/89.15 |
| 3,738,183 | 6/1973 | Ball, Jr. et al. | 74/89.15 |
| 4,338,961 | 7/1982 | Karpenko | 137/331 |
| 4,346,728 | 8/1982 | Sulzer | 137/331 |

*Primary Examiner*—George L. Walton

*Attorney, Agent, or Firm*—Malcolm McQuarrie

[57] ABSTRACT

An improved, motorized Lunkenheimer valve is provided having two independently actuated drive means for operating the valve, one of which moves the valve stem and disc longitudinally along the axis of the stem and the other of which rotates the stem and disc about the longitudinal axis of the stem. The two drive means can be operated concurrently to effect more rapid opening or closing, and countercurrently to provide a continuous grinding operation when the valve is in the closed position.

3 Claims, 4 Drawing Figures

29 34 34 28 31 2 2 24 23 25 3 3 30 4 4 26 27 21 32 22 TO CONTROL 33 TO CONTROL 17 18 19 10 13 16 14 12

IMPROVED SELF-GRINDING VALVE

BACKGROUND OF THE INVENTION

This invention pertains to valves, and particularly to an improvement in the type of valve known as a Lunkenheimer valve. For a description of the Lunkenheimer valve see U.S. Pat. No. 2,996,075, the specification of which is incorporated herein by reference.

Such valves may be used wherever valves are required, but have proven especially useful in controlling the flow of caustic liquor in large diameter pipes in a Bayer plant where aluminum hydroxide is produced from bauxite.

The conventional Lunkenheimer valve has several shortcomings. One is that heretofore it has been manually controlled and has not been adapted to automated operation. Another is that, when used in a Bayer plant, it is subject to the buildup of scale from the caustic liquids passing through it. In the original Lunkenheimer valve, this scale can be removed only by taking the valve out of service.

While improvements in the Lunkenheimer valve have been made to make it self-cleaning, for example as shown in U.S. Pat. Nos. 4,177,825 and 4,338,961, the valves of these patents are relatively complicated. The present invention, on the other hand, provides a relatively simple mechanism for converting the original Lunkenheimer valve to a selfcleaning valve, while at the same time securing other advantages, as will become apparent from the following description.

SUMMARY OF THE INVENTION

The present invention pertains to an improvement in the Lunkenheimer valve wherein the stem rotating means and the screw means are each driven independently of the other by remotely controlled drive means and wherein the stem rotating means and screw means are fixed relative to each other and relative to the valve casing so as to prevent longitudinal motion along the axis of the stem relative to each other or to the casing.

DETAILED DESCRIPTION

Figure 1:
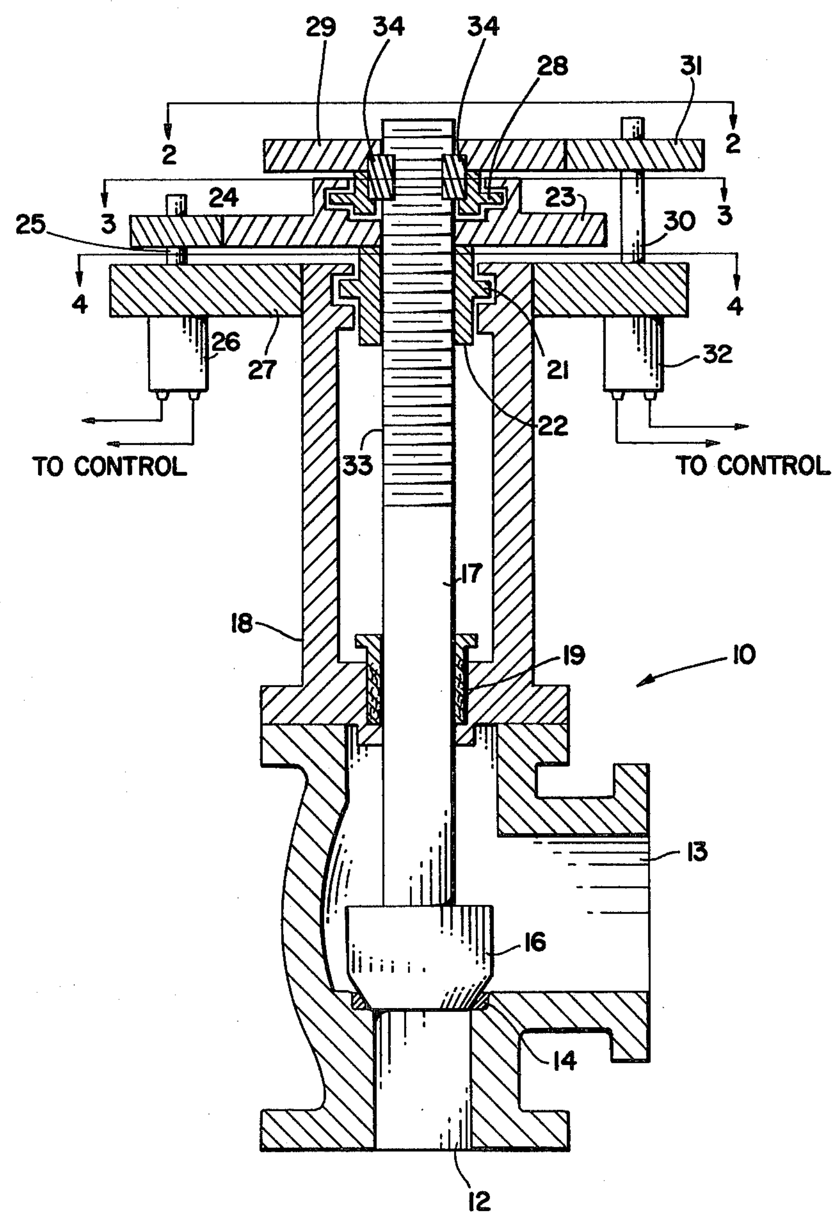
FIG. 1 is a vertical, partially sectioned view of a valve according to this invention.
Figure 2:
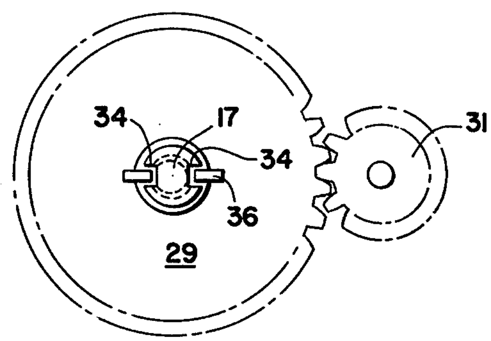
FIG. 2 is a view looking down on the top of the valve with the lower parts of the valve removed for purposes of clarity.
Figure 3:
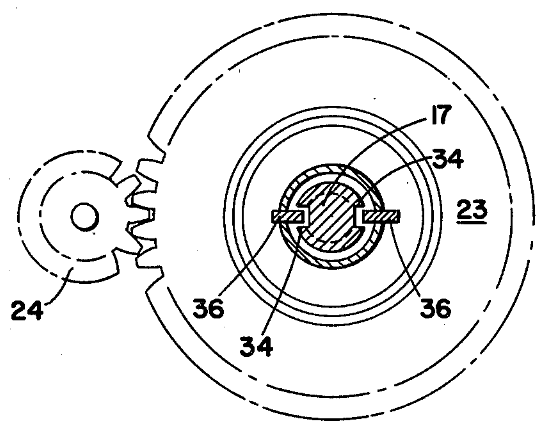
FIG. 3 is a horizontal section along the line 3—3 of FIG. 1, again with lower portions of the valve removed for purposes of clarity.
Figure 4:
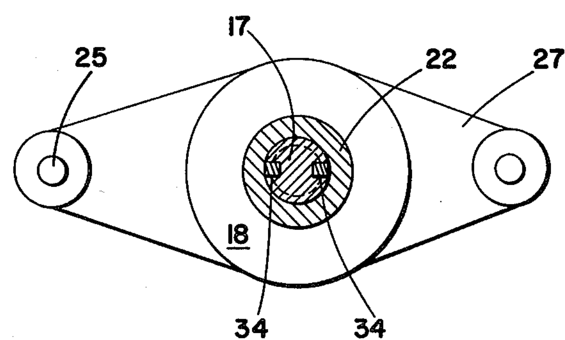
FIG. 4 is a horizontal section through the valve along the line 4—4 of FIG. 1.

As shown in FIG. 1, valve 10 comprises a valve body 11 having an inlet 12 and an outlet 13. Disposed in valve body 11 between inlet 12 and outlet 13 is a valve seat 14. Also located within valve body 11 is a disc 16 adapted to bear on seat 14 to close off flow between inlet 12 and outlet 13. Disc 16 is carried on valve stem 17 and moves into and out of engagement with valve seat 14 as stem 17 is moved toward or away from seat 14 along the longitudinal axis of stem 17. As is known in this art, seat 14 and disc 16 may carry a hard facing material on their contacting surfaces.

Above valve body 11 is yoke 18 which carries stem 17, the drive system therefor (to be described presently), and associated bearings, such as packing bearing 19, which prevents leakage of fluid within valve body 11 out around valve stem 17, and thrust bearing 21.

Carried in thrust bearing 21 is stem nut 22 which is attached to stem nut gear 23, this in turn being driven by stem nut drive gear 24, the latter in turn being driven through shaft 25 by stem nut drive motor 26, which is carried on retainer 27.

Also carried on stem nut gear 23 is a second thrust bearing 28, which in turn carries stem gear 29. This gear is driven by stem drive gear 31, which in turn is driven through shaft 30 by stem drive motor 32, also mounted on retainer 27. It can be seen that the structural connection of valve body 11, yoke 18, bearing 21, nut 22, gear 23, bearing 28, and gear 29 prevents relative motion between nut 22 and gear 29 and between these and valve body 11 in the direction of the longitudinal axis of stem 17.

Drive motors 26 and 32 may be of any suitable type. While air motors are preferred in a particular Bayer plant operation, they could be electric motors, hydraulic motors, or the like.

Stem 17 carries at its upper end, for approximately half its length, threads 33 which match with corresponding threads in nut 22. Stem 17 also carries at its upper end for approximately half its length, two diametrically opposed slots 34. Attached to stem gear 29 are two keys 36 which lie within slots 34 in stem 17 and are of such size that they can move freely within slots 34 when stem 17 is moved longitudinally.

As to operation of the valve, as will be evident to those familiar with the Lunkenheimer valve, when motor 26 is activated, nut 22 will be turned, thus driving stem 17 longitudinally without rotation of stem 17 and attached disc 16 about the longitudinal axis of stem 17. (Internal friction and the high gear ratio between gears 29 and 31 prevents "back driving" of gear 29.) The direction of movement of stem 17, and disc 16, will depend on which direction motor 26 is rotated; in one direction it will open valve 10 by moving disc 16 away from seat 14, and in the other direction it will close valve 10 by moving disc 16 toward seat 14.

Similarly, if motor 32 is activated, stem 17 will be rotated and, because of its threaded connection with nut 22, be driven longitudinally while at the same time rotating about its longitudinal axis, imparting a corresponding motion to disc 16. (Again, internal friction and the high gear ratio prevent "back driving" of nut 22.) Again, as will be evident, the direction of rotation of motor 32 will determine whether valve 10 is opened or closed.

As will be evident to those skilled in the art, the valve of the present invention operates, insofar as its actual function to open and close the valve, very similarly to that of a conventional Lunkenheimer valve. However, the valve of the present invention has several advantages. In the first place, it is not necessary to open and close the present valve manually, but it can be done by remote control operation of motors 26 and 32. Furthermore, when both motors 26 and 32 are operated simultaneously to either open or close the valve, the opening and closing action will take place at twice the speed of a conventional Lunkenheimer valve operated manually in one of its two modes. The fact that the valve can be opened with either a rotating or nonrotating, longitudinal motion of the stem and disc has the advantage that opening a valve which may tend to be slightly "stuck", can be done by longitudinal motion where the force needed will be considerably less than that needed to rotate the valve seat when it is in the closed position.

However, one of the principal advantages of the valve of the present invention is that it is a self-grinding valve which can operate in a continuous grinding mode. If stem drive motor 32 is operated in the "close" direction, so as to drive stem 17 and attached disc 16 against seat 14, and at the same time stem nut drive motor 26 is operated in the "open" direction, valve 10 will operate in a self-grinding mode for so long as motors 26 and 32 are so operated together. The rotation of stem 17 in what would otherwise be a downward direction combined with the rotation of stem nut 22 in the opposite direction means that disc 16 does not move longitudinally along the axis of stem 17 but rather remains in place in contact with seat 14, grinding the seat clean of any accumulated debris and the like. In the self-grinding mode, stem 17 is turned slightly faster than stem nut 22 to cause bottoming of disc 16 on seat 14 and ensure grinding pressure. When air motors are used, the force of disc 16 on seat 14 can be controlled by adjusting the air pressure to the motors. The speed of grinding (i.e., rate of rotation of disc 16 over seat 14) is determined by the speed of rotation of stem nut 22.

While this invention has been described as a modification of a conventional Lunkenheimer valve, it will be evident that it can be adapted to use with any valve, such as Stockham, Powell, and Anchor-Darling valves, to convert such valve to an operation similar to that of a Lunkenheimer valve and at the same time achieve the self-grinding and other advantages of the modified Lunkenheimer valve of this invention.

It will be understood that there can be added to the valve of the present invention various devices previously known in this art, for example devices such as shown in U.S. Pat. No. 4,177,825 and U.S. Pat. No. 4,338,961 to protect moving parts of the valve such as the valve stem from the corrosive action of liquids flowing through the valve. Such details, which form no part of the present invention, have been omitted from the drawing illustrating this invention in the interests of simplicity. Similarly, other details of the valve, such as details of the packing and bearing constructions, which are well-known to those skilled in the art, have also been omitted in the interests of simplicity in presenting the present invention.

I claim:

1. In a valve of the type having (1) a casing having (2) an inlet opening and (3) an outlet opening and (4) a valve seat intermediate the inlet and outlet openings, (5) a disc adapted to sit on and seal the valve seat thereby preventing flow from the inlet to the outlet, (6) a longitudinal stem attached to the disc at one end and having a threaded portion intermediate its ends, (7) stem rotating means operatively attached to the stem to cause it to rotate about its longitudinal axis, (8) nut means operatively attached to the threaded portion of the stem, and (9) means operative either to hold the nut means fixed with respect to the casing or to rotate the nut means, thereby moving the stem longitudinally, said stem rotating means being operative in a first operating mode, wherein the nut means is fixed with respect to the casing, to move the stem longitudinally, thereby moving the disc toward or away from the valve seat, and said nut operative means being operative in a second operating mode wherein said stem rotating means prevents rotation of the stem, to move the stem longitudinally, the improvement wherein the stem rotating means and the nut operative means are each driven independently of the other and wherein the stem rotating means and the nut operative means are fixed relative to each other and relative to the valve casing so as to prevent their longitudinal motion along the axis of the stem relative to each other or to the casing, and control means operatively connected to the stem rotating means and the nut operative means to operate them (a) individually, so that the stem and the disc move longitudinally with or without rotation, depending on the mode chosen, or (b) concurrently in the same direction so that the stem and the disc move more rapidly toward or away from the valve seat than when the stem rotating means or the nut operative means are operated individually or (c) in opposition so that the stem and the disc rotate but do not move longitudinally whereby the valve can be continuously self-grinding after the disc is seated on the valve seat.

2. Valve according to claim 1 wherein said stem rotating means and said nut operative means are motors.

3. Valve according to claim 2 wherein said motors are air motors.

* * * * *